(12) United States Patent
Inatomi (10) Patent No.: US 9,796,255 B2
(45) Date of Patent: Oct. 24, 2017

(54) RESIN TORQUE ROD

(71) Applicant: YAMASHITA RUBBER KABUSHIKI KAISHA, Fujimino-shi, Saitama (JP)

(72) Inventor: Takatoshi Inatomi, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/902,718

(22) PCT Filed: Aug. 13, 2014

(86) PCT No.: PCT/JP2014/071412
§ 371 (c)(1),
(2) Date: Jan. 4, 2016

(87) PCT Pub. No.: WO2015/022982
PCT Pub. Date: Feb. 19, 2015

(65) Prior Publication Data
US 2016/0176279 A1  Jun. 23, 2016

(30) Foreign Application Priority Data

Aug. 14, 2013 (JP) ................................. 2013-168737

(51) Int. Cl.
*F16G 15/08* (2006.01)
*B60K 5/12* (2006.01)
*F16F 1/38* (2006.01)
*F16F 15/08* (2006.01)

(52) U.S. Cl.
CPC .......... *B60K 5/1208* (2013.01); *B60K 5/1241* (2013.01); *F16F 1/38* (2013.01); *F16F 1/3849* (2013.01); *F16F 15/08* (2013.01)

(58) Field of Classification Search
CPC .............................. F16F 15/08; B60K 5/1208
See application file for complete search history.

(56) References Cited

U.S. PATENT DOCUMENTS 9,470,289 B2 * 10/2016 Shimada .............. B60K 5/1208

* cited by examiner

*Primary Examiner* — Amy Sterling
(74) *Attorney, Agent, or Firm* — Rankin, Hill & Clark LLP (57) ABSTRACT

A first ring section and a second ring section made of resin are integrally formed in both ends in the direction of a center axis of a rod section. A plurality of first ribs, intermediate ribs, and second ribs are provided in an outer circumferential surface of the second ring section so as to project in the direction intersecting at right angles to a center axis of the second ring section. The first ribs and the intermediate ribs, and the second ribs each are integrally connected on either side in the left and right direction to vertical ribs that are formed long in the direction of the center axis. Projecting heights of the vertical ribs and the second ribs are varied along inclined straight lines.

6 Claims, 7 Drawing Sheets

RESIN TORQUE ROD

TECHNICAL FIELD

The present invention relates to a torque rod and, more particularly, to the torque rod provided with a plurality of ribs.

BACKGROUND ART

A torque rod as a vibration isolating device to be used in the case of mounting an engine on a vehicle body is publicly known. In addition, the torque rod made of resin is also publicly known. When the resin torque rod is provided with a plurality of ribs, it is possible to obtain a decrease in weight and an increase in rigidity (see a patent reference 1, for instance). Moreover, there is the torque rod of the type that has a curved or bent rib (see a patent reference 2, for instance).

PRIOR ART REFERENCE

Patent reference 1: Japanese Patent Application Laid-open Publication No. 2010-019323.
Patent reference 2: Japanese Patent No. 5,095,577.

DISCLOSURE OF THE INVENTION

Problem to be Solved by the Invention

By the way, the resin torque rod becomes comparatively large in size when required strength and durability are increased. Therefore, the resin torque rod is required to be compactified as far as possible in order to improve mountability. However, due to compactification it is not permissible to harm the rigidity.

Therefore, it is desired to provide the resin torque rod capable of attaining the high rigidity and the compactification. The present invention aims at realizing the above referred requirements.

Means for Solving the Problem

To solve the above described problems, a resin torque rod according to a first feature of the present invention comprises ring sections integrally formed in both ends in a longitudinal direction of a rod section (12), and a plurality of lateral ribs (50, 44, 54A, 54B) being provided in an outer circumferential surface of at least one ring section (16) and projecting in the direction intersecting at right angles to the direction of a center axis (C2) of the ring section (16), wherein projecting heights of each of the lateral ribs are inclined rectilinearly in the direction of the center axis (C2).

According to a second feature of the present invention, in addition to the first feature, the projecting heights of each of the lateral ribs are highest in a middle portion thereof in the direction of the center axis (C2) and are gradually lowered with approach towards both sides in the direction of the center axis (C2).

According to a third feature of the present invention, in addition to the first or second feature, the projecting heights of the lateral ribs (54A, 54B) in the direction of the center axis (C2) are varied unequally or unevenly by variations in depth of each groove located between the neighboring lateral ribs (54A, 54B).

According to a fourth feature of the present invention, in addition to any one of the first through third features, the lateral ribs each of which is formed at predetermined spaced intervals in the direction of the center axis (C2) are integrally connected by a vertical rib (52) which is formed long in the direction of the center axis (C2).

According to a fifth feature of the present invention, in addition to any one of the first through fourth features, the vertical rib (52) is inclined in such a way as to project most outwardly in a middle portion thereof in the direction of the center axis (C2).

Effects of the Invention

According to the first feature of the present invention, with the arrangement of the plural lateral ribs (50, 44, 54A, 54B), the predetermined rigidity can be ensured. Since the projecting heights of the lateral ribs are varied in such a way as to be gradually lowered in the direction of the center axis (C2) and thus the contours thereof in the direction of the center axis (C2) are inclined, the projecting heights become lower with approach towards each of axial ends of the center axis (C2) whereby to make it possible to be compactified in the direction of the axial ends of the center axis (C2). In addition, since only the projecting heights are varied without reduction in the number of the lateral ribs, the required rigidity can be ensured at the same time.

According to the second feature of the present invention, since the projecting heights of the lateral ribs are configured to project most outwardly in the middle portion thereof in the direction of the center axis (C2) and to be gradually lowered with approach towards both sides in the direction of the center axis (C2), the directions of each axial end of the center axis (C2) can be compactified. Moreover, the required rigidity on both sides in the axial direction of the center axis (C2) can be ensured at the same time.

According to the third feature of the present invention, since the projecting heights of the lateral ribs (54A, 54B) in the direction of the center axis (C2) are varied unequally or unevenly by varying the depths of the grooves located between the neighboring lateral ribs (54A, 54B), the cooling property can be improved and the occurrence of voids can be prevented.

According to the fourth feature of the present invention, since each of the lateral ribs is integrally connected by the vertical rib (52) which is formed long in the direction of the center axis (C2), the rigidity in whole can be heightened by each of the lateral ribs.

According to the fifth feature of the present invention, the vertical rib (52) is configured to project most outwardly in the middle portion thereof in the direction of the center axis (C2) and to be inclined inwardly towards both sides in the direction of the center axis (C2), the vertical rib (52) also can be prevented from more projection than it needs.

BEST MODE FOR CARRYING OUT THE INVENTION

Hereinafter, an embodiment of the present invention will be explained with reference to accompanying drawings.

This torque rod 10 has a main body portion 18 which is made of publicly known proper resin such as FRP, etc. and which is integrally formed with a rod section 12 of long bar shape, a first ring section 14 and a second ring section 16 which are provided on both sides in the longitudinal direction of the rod section 12.

Figure 4:
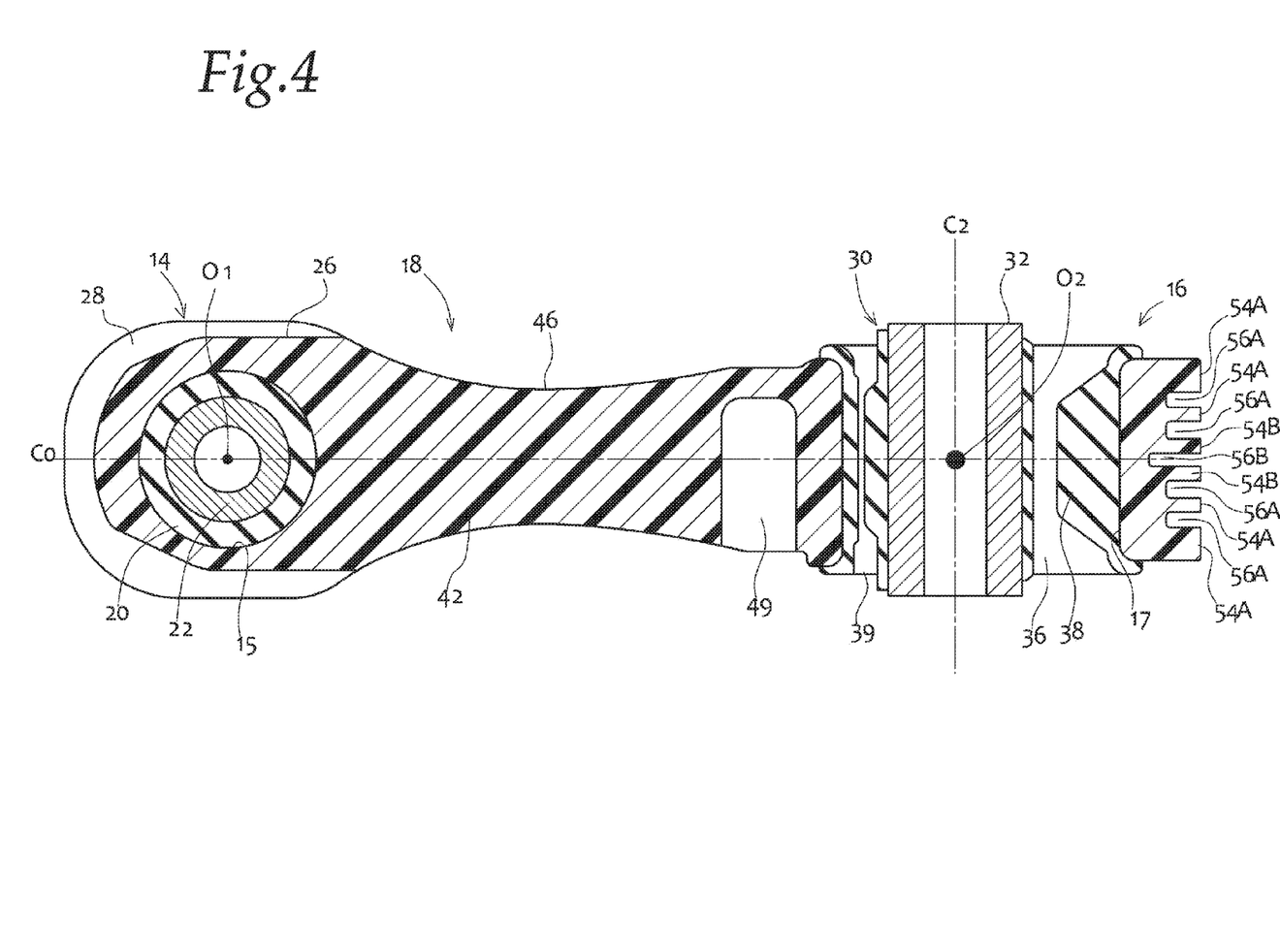
FIG. 4 is a cross sectional view taken along line 4-4 of FIG. 2.

The first ring section 14 is provided with a ring hole 15 (see FIG. 4) and connected to a first inside member 22 through a first elastic body 20 which is arranged on the inside of the ring hole 15. The first elastic body 20 is made of proper elastic material such as rubber and the like and elastically connects the first ring section 14 and the first inside member 22 by a proper means such as curing adhesion and the like. The first inside member 22 is a pipe member made of metal and the like and is mounted on an engine (not shown in the drawing) by a bolt and the like (not shown in the drawing) which is inserted into the first inside member 22.

The second ring section 16 has a ring hole 17 (see FIG. 4) and is connected to a second inside member 32 through a second elastic body 30 which is arranged on the inside of the ring hole 17. The second elastic body 30 is made of proper elastic material such as rubber and the like and elastically connects the second ring section 16 and the second inside member 32 by a proper means such as curing adhesion and the like.

The second inside member 32 is a pipe member made of metal and the like and is mounted on a vehicle body (not shown in the drawing) by a bolt and the like (not shown in the drawing) which is inserted into the second inside member 32.

Figure 1:
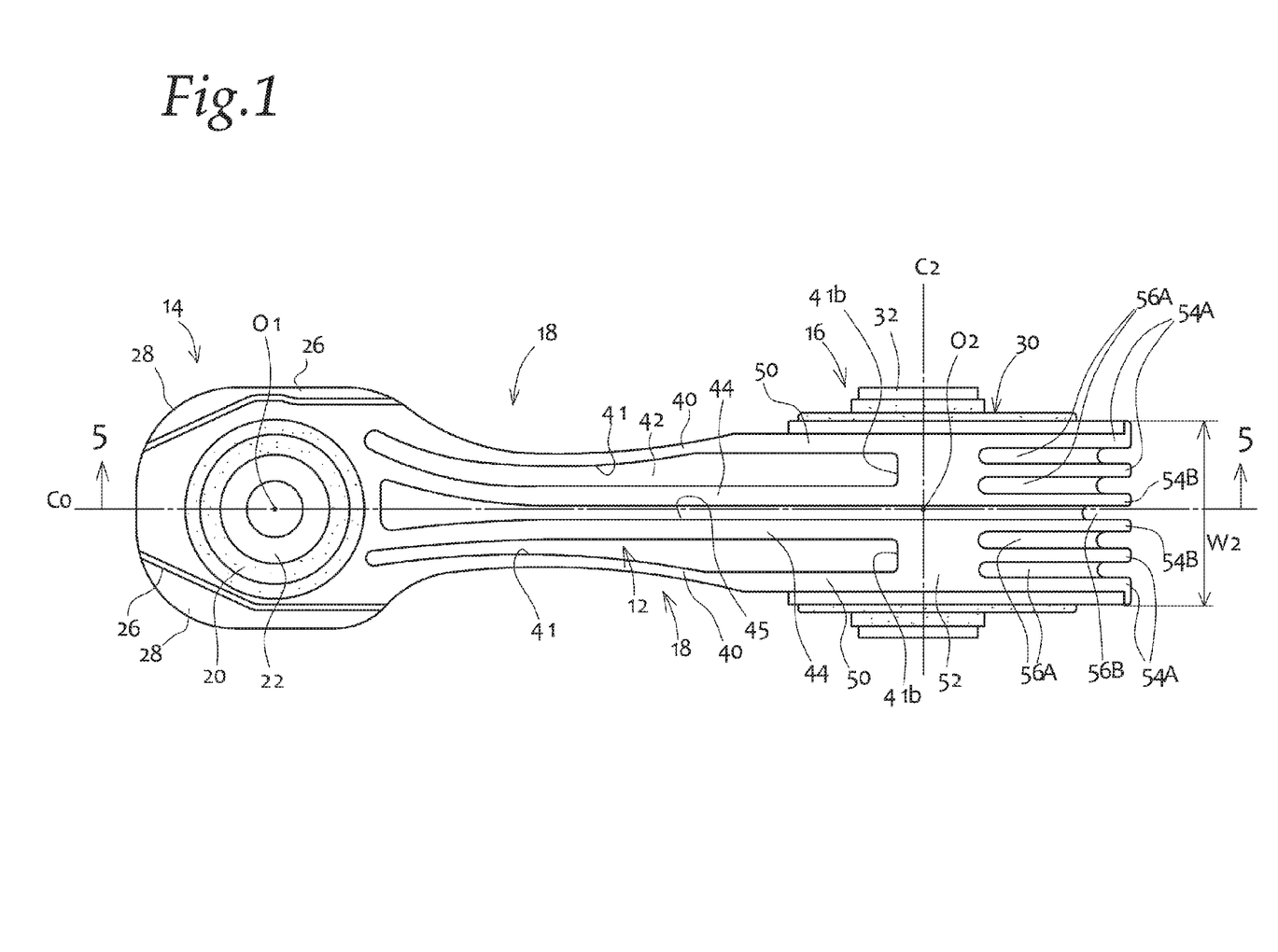
FIG. 1 is a front view of a torque rod.
Figure 2:
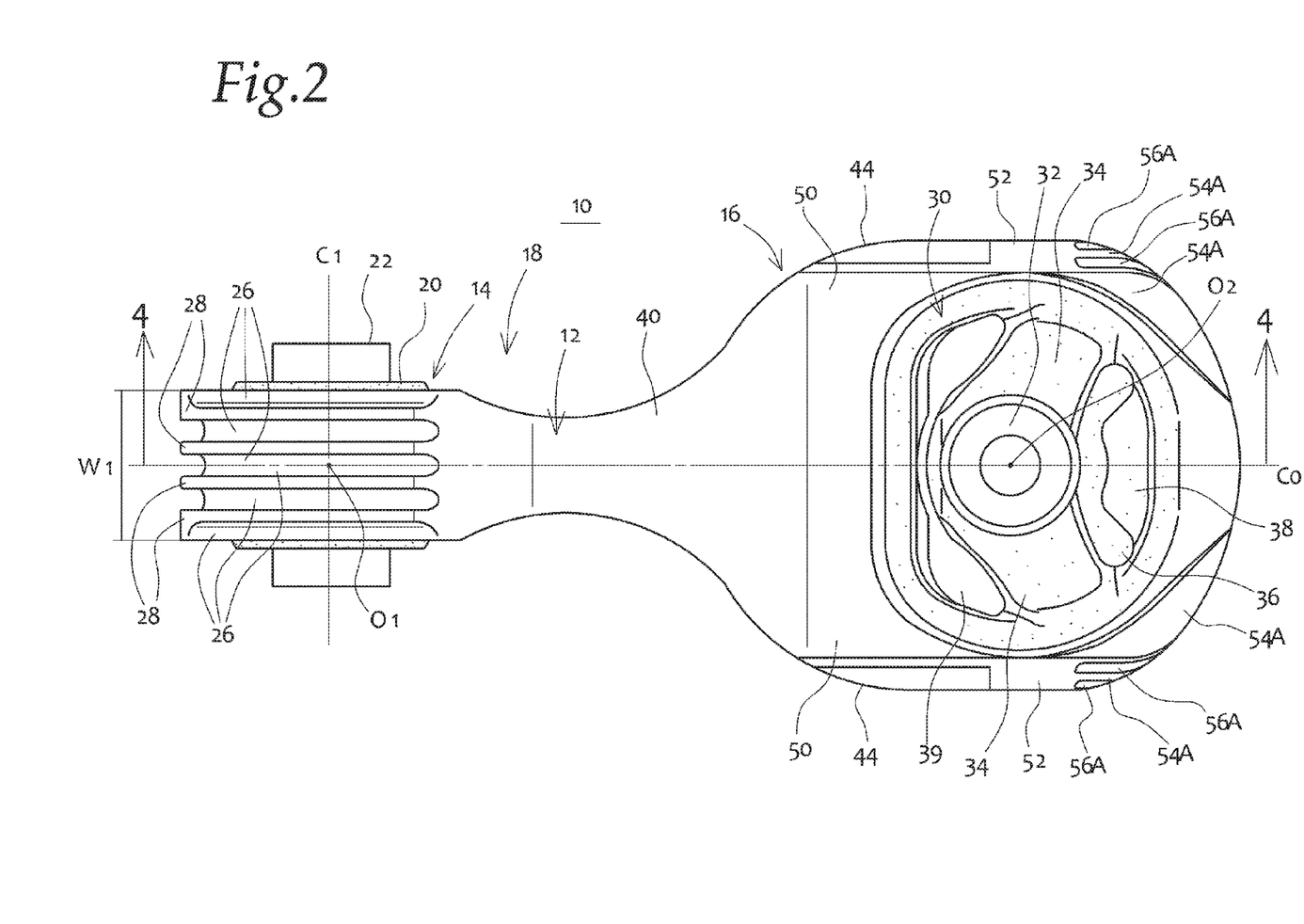
FIG. 2 is a plan view thereof.
Figure 3:
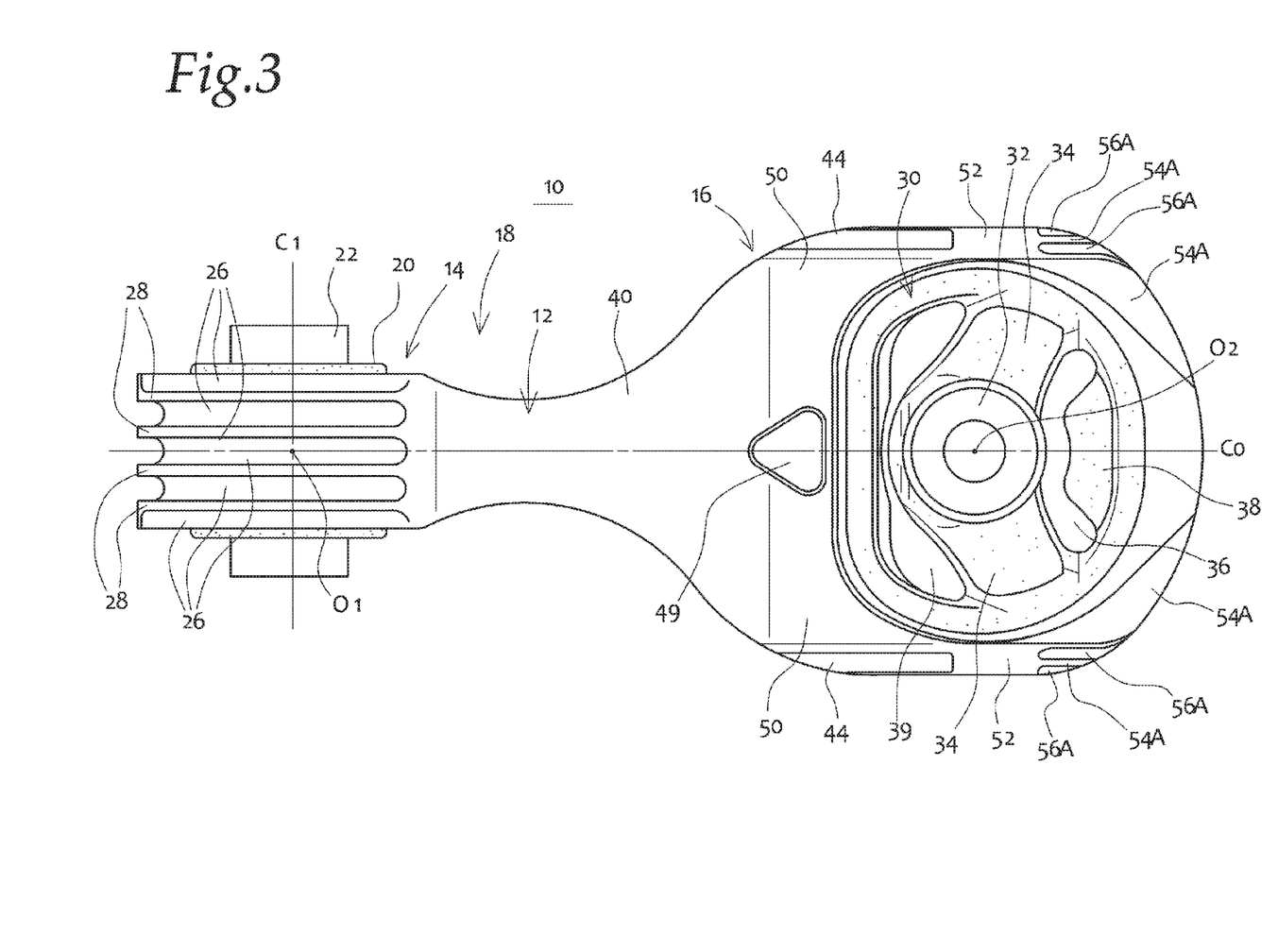
FIG. 3 is a bottom view thereof.

Herein, a center of the first ring section 14 is designated by O1, a center of the second ring section 16 is designated by O2, and a straight line connecting these centers is designated as a center axis C0. In addition, a center axis of the first ring section 14 is designated by C1 and a width thereof is designated by W1 (FIG. 2). A center axis of the second ring section 16 is designated by C2 and a width thereof is designated by W2 (FIG. 1). The center axis C1 is also an axis of the first inside member 22, and the center O1 is located in the middle of the width W1 on the center axis C1. The center axis C2 is also an axis of the second inside member 32, and the center O2 is located in the middle of the width W2 on the center axis C2.

The center axes C1 and C2 intersect at right angles with each other and are twisted at 90° relative to each other. However, the torque rod of the present invention is not limited to such twisted type and may be of the type that has the center axes C1 and C2 which extend in parallel with each other.

The center axis C0 intersects at right angles with these center axes C1 and C2. Moreover, in this embodiment, the rod section 12 is symmetrically formed about the center axis C0 (see FIG. 2), and the center axis C0 is also a center axis of the rod section 12.

Herein, the direction of the center axis C0 shall be the forward and rearward direction, and the direction of the center axis C2 shall be the upward and downward direction. In addition, the left side of FIG. 1 shall be the forward direction, and the upper side thereof shall be the upward direction. Further, in FIG. 2, the direction of the center axis C1 shall be the left and right direction, and the upper side of the drawing is the right direction.

As shown in FIG. 2, the second elastic body 30 has arm sections 34 which extend left and right from the second inside member 32, and functions as a main body portion of vibration isolation.

The arm sections 34 are formed in substantially a V-shape which is convexed in the forward direction in a plan view and spreads laterally toward the rear. The second inside member 32 is opposed to a stopper 38 through a void 36 which passes through in the upward and downward direction. Also in front of the arm section 34 there is formed a void 39 which passes through in the upward and downward direction.

When the engine and the vehicle body are connected by this torque rod 10, the vibrations of the engine in the upward and downward direction and in the forward and rearward direction are inputted through the first inside member 22 to the first ring section 14 so that the first elastic body 20 is elastically deformed. At that time, the first elastic body 20 is twisted, and the torque rod 10 is rocked about the first inside member 22 as a rocking center, so that the second ring section 16 moves in the forward and rearward direction to thereby allow the arm sections 34 to be elastically deformed. Due to this operation, the vibrations are isolated by the torque rod 10 whereby to reduce the vibration transmission to the vehicle body.

Figure 5:
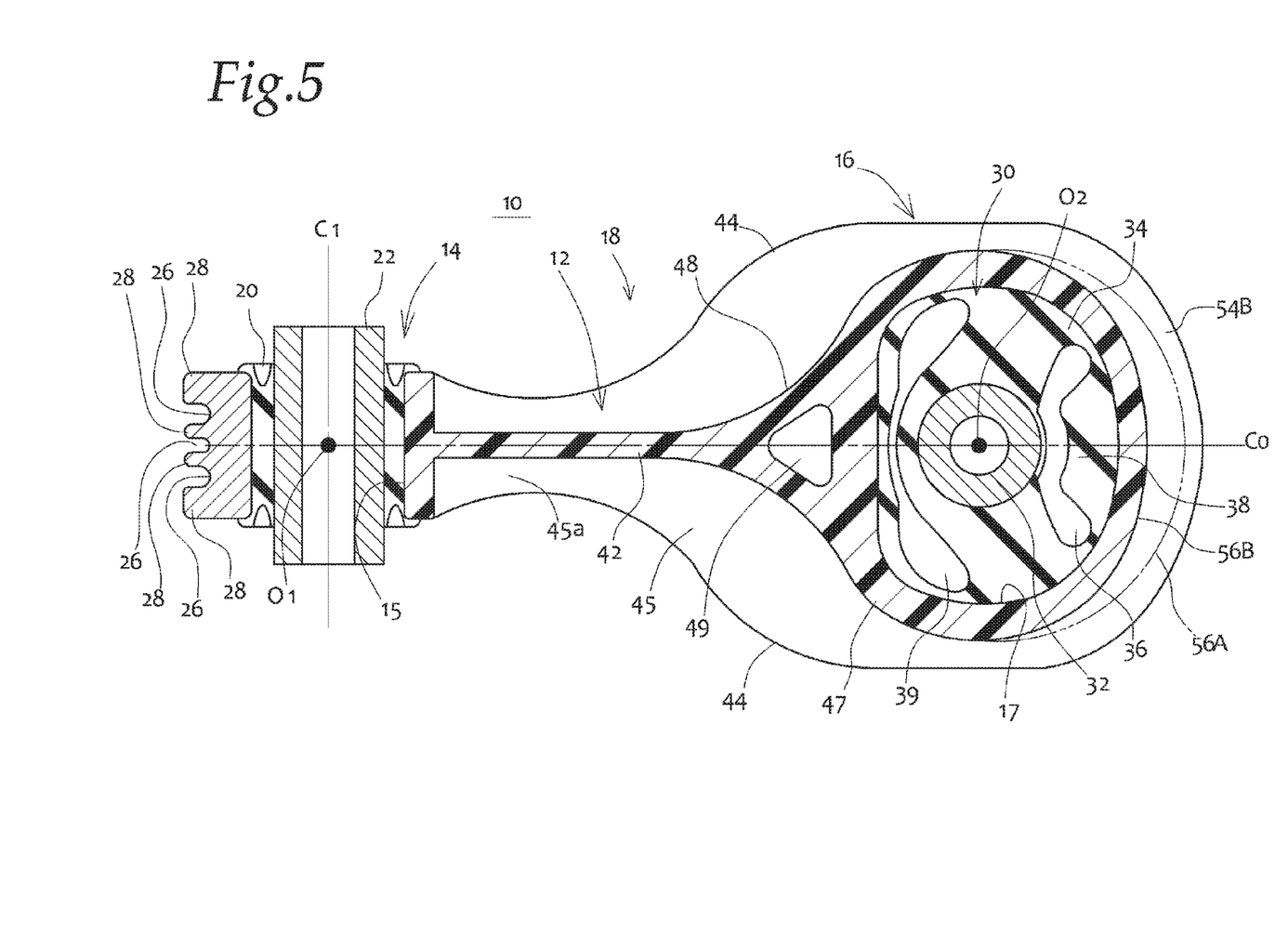
FIG. 5 is a cross sectional view taken along line 5-5 of FIG. 1.

As shown in FIG. 5, a columnar section 42 extends rearwardly along the center axis C0 in the forward and rearward direction and is connected to a cylindrical section 47 of the second ring section 16. The cylindrical section 47 surrounds the ring hole 17 and is of comparatively thin-walled ring shape a circumference of which is surrounded by a center groove 45 and a deep groove 56B. Each of lateral ribs and vertical ribs 52 (to be referred to later) projects radially outwardly from this cylindrical section 47 as a basal part. A thick-walled section 48 of substantially triangular shape is formed in a connecting region between the cylindrical section 47 and the columnar section 42. A lightening hole 49 of substantially triangular shape is formed in this thick-walled section 48 in a downwardly opening fashion (see FIG. 4).

As shown in FIGS. 1 and 2, the second ring section 16 is larger in size than the first ring section 14 and is of generally square shape in a plan view. This shape corresponds to those of the lateral ribs which are formed of first ribs 50, second ribs 54A and 54B. In the second ring section 16, there are provided a plural number of lateral ribs.

Among those ribs, the ribs in a front half part of the second ring 16 are formed of first upper and lower ribs 50. These first ribs 50 are configured to be continuous with upper and lower ribs 40 of the rod section 12 located forwardly.

Rear portions of the first ribs 50 are connected by upwardly and downwardly extending vertical ribs 52 on each lateral side of the second inside member 32 and are continuous with second ribs 54A through the vertical ribs 52. An upper surface (a lower surface) of the first rib 50 is integrally connected to and continuous with the second rib 52A.

Between the upper and lower first ribs 50, there are provided rear portions of two intermediate ribs 44. The rear portion of the intermediate rib 44 is a part which extends continuously rearwardly from the rod section 12, and each of rear end portions of the intermediate ribs 44 is connected continuously with the vertical rib 52. Between each of the intermediate ribs 44 and each of the upper and lower ribs 40, there are provided upper and lower grooves 41 which are formed long in the forward and rearward direction so as to extend along the intermediate ribs 44.

Each of rear end portions 41b of the upper and lower grooves 41 is formed in such a way as to recess an outer circumferential surface of the second ring section 16 and extends rearwardly in parallel with the center axis C0 to thereby be connected to the vertical rib 52.

The center groove 45 extends rearwardly along the center axis C0 and is lengthened across the vertical rib 52 further rearwardly.

On the outer circumferential surface of the second ring section 16 located on the rear side of the vertical rib 52 there are formed a plurality of second ribs 54A and 54B each of which extends in parallel. Four second ribs 54A, two on each upper and lower side of an extension part (groove 56B) of the center groove 45 are formed in parallel and each have comparatively low projecting heights. There are provided two second ribs 54B each of which extends in parallel at opposite sides of the center axis C0 and has a comparatively high projecting height.

Rear ends of each of the second ribs 54A and 54B are located in the same position to be flush with each other. Therefore, the variations of the projecting heights are configured to be formed by groove depths which are formed between the second ribs 54A and 54B. Namely, only the groove 56B located between the pair of second ribs 54B which have higher projecting heights is deeper, and other grooves 56A are comparatively shallow.

For this reason, only the pair of second ribs 54B formed by the deeper groove 56B is higher in the projecting height than other second ribs 54A. Thus, the projecting heights of the ribs are formed unequally or unevenly.

By the way, left and right end portions of each of the grooves 56A are connected to the left and right vertical ribs 52. On the other hand, the deeper groove 56B is formed on the center axis C0, and left and right end portions thereof are continuous with the center grooves 45 each of which extends across the vertical rib 52.

Figure 6:
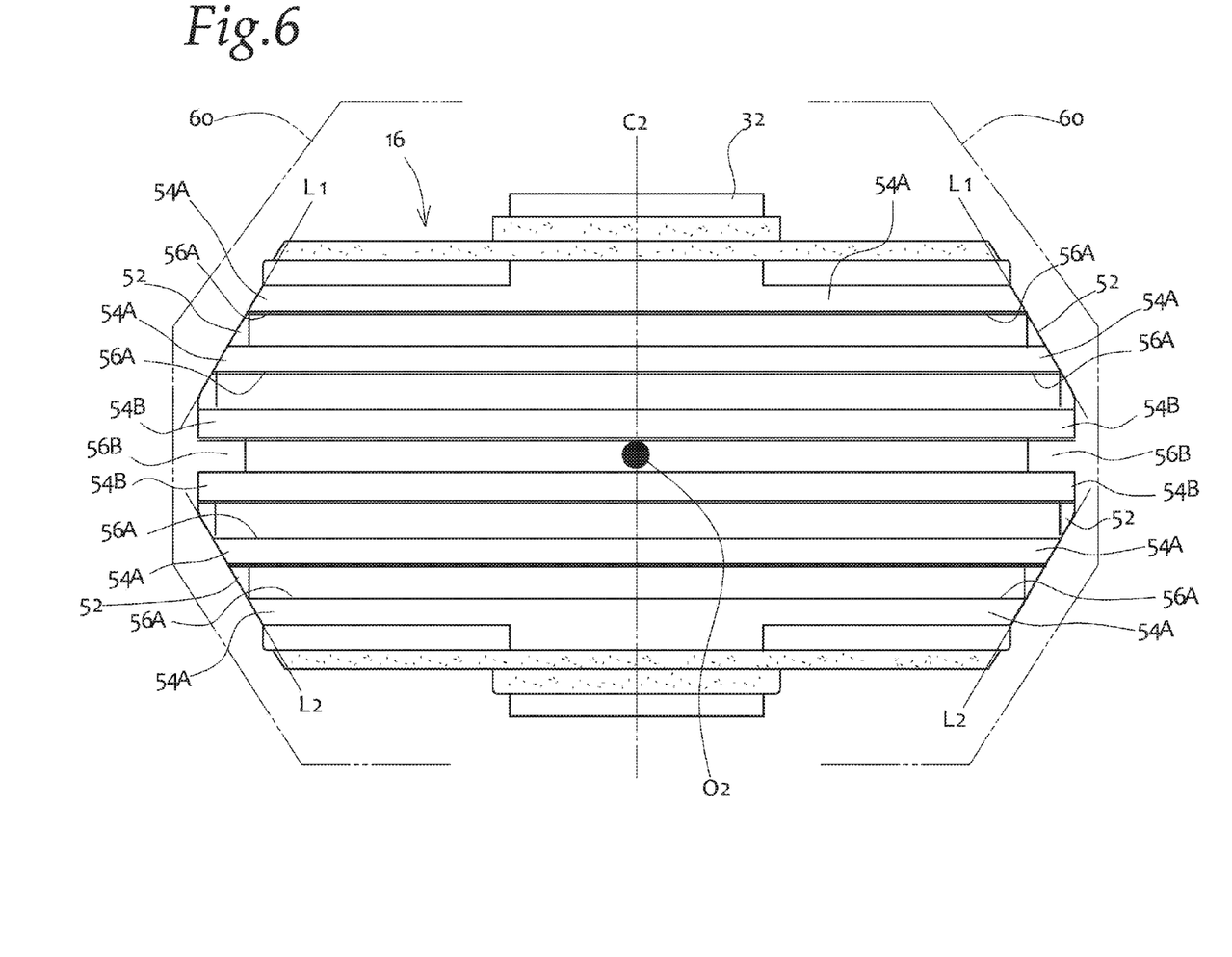
FIG. 6 is a side view (a rear side view of a second ring section)

FIG. 6 is a side view of the second ring section 16 as seen from the rear side. End portions in the left and right direction of each of the second ribs 54A and 54B are inclined along straight lines L1 and L2. The straight lines L1 are inclined in such a condition as to gradually converge at the center axis C2 in the upward direction, projecting tips in the left and right direction of the second ribs 54A and 54B located on the upper side of the groove 56B are configured to extend along these straight lines L1.

Accordingly, the projecting heights in the left and right direction of the second ribs 54A and 54B which constitute the lateral ribs become lower towards the upper side, and the projecting heights in the left and right direction of each of the ribs are varied in such a condition as to be gradually lowered towards the upper side. Thus, the projecting heights are configured to be unequal or uneven. In addition, the inclinations of the straight lines L1 correspond to the inclinations of the vertical ribs 52. The vertical ribs 52 are inclined along the straight lines L1 and L2.

The projecting heights in the left and right direction of the second ribs 54A and 54B located on the lower side of the groove 56B extend along the straight line L2 which is inclined in the opposite direction of the straight line L1. An angle of the straight line L2 with respect to the center axis C2 is the same as the straight line L1. Accordingly, the projecting heights in the left and right direction of the second ribs 54A and 54B which constitute the lateral ribs located downwardly of the groove 56B are configured to be unequal or uneven.

Figure 7:
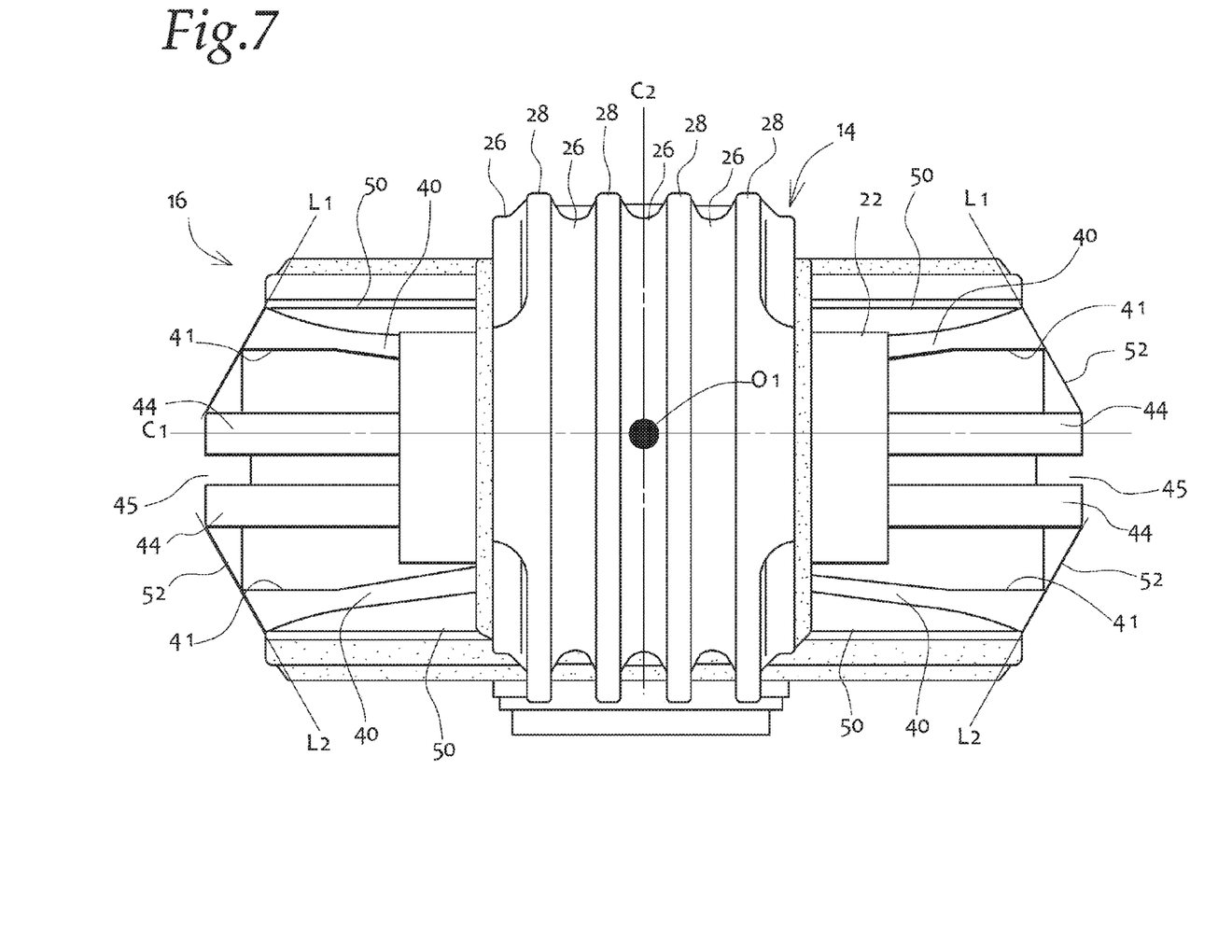
FIG. 7 is a side view (a front side view of a first ring section).

FIG. 7 is a side view of the first ring section 14 and the second ring section 16 in an opposite direction as seen from the front side. As apparent from this drawing, with respect to the second ring section 16, also when viewed from the forward side, the projecting heights in the left and right direction of the upper and lower ribs 40 and the intermediate ribs 44 are varied along the vertical ribs 52 each of which is inclined along the straight lines L1 and L2. Accordingly, also on the front half side of the second ring section 16, the projecting heights of each of the lateral ribs are configured to be unequal or uneven.

By the way, with respect to each of the lateral ribs in the front and rear regions of the second ring section 16, the inclination on the upper region and the inclination on the lower region are not necessarily formed at the same angle of inclination, and may be formed at the different angles of inclination. Similarly, the angles of inclination on the left side and on the right side may be varied as well.

In addition, with respect to each of the straight lines L1 and the L2, the angles of inclination may be freely adjusted.

Next, the operation of this embodiment will be explained. As shown in FIG. 1, the second ring section 16 has the different number of lateral ribs between the front region and the rear region on either sides of the vertical rib 5 such that the front region is small in number and the rear region is large in number. With this arrangement, the front region which requires relatively low rigidity can be lightened in a large way whereby to make it possible to realize the reduction in weight. On the other hand, the rear region which requires relatively high rigidity has a larger number of lateral ribs whereby the rigidity is heightened.

Further, since the upper and lower first ribs 50 and the intermediate ribs 44 which constitute the lateral ribs in the front region are connected by the vertical ribs 52 to the second ribs 54A and 54B which constitute the lateral ribs in the rear region, the rigidity of all the lateral ribs can be heightened.

Further, also by widening the projecting widths of the lateral ribs, the rigidity of each of the lateral ribs can be increased. Moreover, since the projecting heights in the left and right direction of each of the lateral ribs are inclined in such a way as to be lowered towards the upper and lower sides, the projecting heights in the left and right direction of the lateral ribs located on the upward side and on the downward side can be decreased. As a result, the left and right direction can be comparatively compactified while maintaining the required high rigidity. For instance, as shown in FIG. 6, even in the case where the space in the upward and downward direction between the second ring section 16 and a peripheral member 60 is narrow, the arrangement can be easily performed.

Further, since the projecting heights of each of the lateral ribs are configured to be unequal, the cooling property after molding can be increased as the projecting height becomes higher. When it takes a lot of time for cooling the product directly after molding by means of injection molding and the like, there may be cases where voids occur. In particular, although the projecting heights of the second ribs 54B and of the rear portions of the intermediate ribs 44 are greater in the thick-walled intermediate part in the upward and downward direction that is difficult to be cooled, the cooling property around the intermediated part can be increased and the occurrence of voids can be effectively prevented.

Furthermore, on the rear end side, the rear end portions of each of the lateral ribs are formed flush with each other in the upward and downward direction. However, in this case, the depths of the grooves 56A and 56B are varied, so that the projecting heights of each of the lateral ribs can be made unequal or uneven. In addition, in the left and right direction, the projecting tips in the left and right direction of each of the lateral ribs are inclined, so that the projecting heights of each of the lateral ribs can be formed unequal or uneven.

Further, with respect to the grooves in the middle part in the upward and downward direction, since the center groove 45 and the groove 56B are formed continuously in such a way as to extend across the most thick-walled portion of the vertical rib 52, the cooling property in the thick-walled portion of the vertical rib 52 can be increased.

What is claimed is:

1. A resin torque rod comprising:
   ring sections integrally formed in both ends in a longitudinal direction of a rod section; and
   a plurality of lateral ribs being provided in an outer circumferential surface of at least one ring section and projecting in a direction intersecting at right angles to a direction of a center axis of the ring section, each of the lateral ribs being arranged at a predetermined spaced interval in the direction of the center axis of the ring section from a center portion of the ring portion to each axial end thereof;
   wherein a projecting height of a lateral rib in the center portion of the ring section is relatively higher than a projecting height of lateral ribs spaced toward each axial end of the ring section;
   wherein projecting ends of the lateral ribs are disposed such that a line, which connects the projecting ends of the lateral ribs and is arranged from the center portion towards one axial end, includes a portion that is inclined rectilinearly in the direction of the center axis from the center portion toward said one axial end;
   wherein the lateral ribs are integrally connected by a vertical rib, which has a length direction extending in the direction of the center axis;
   wherein the vertical rib is inclined such that a middle portion thereof projects outwardly further than other portions of the vertical rib.

2. The torque rod according to claim 1, wherein the projecting heights of the lateral ribs in the direction of the center axis are varied unequally by variations in depth of each groove located between the neighboring lateral ribs.

3. The torque rod according to claim 1, wherein the ring section formed in one end in a longitudinal direction of the rod section is larger than the ring section formed in the other end in the longitudinal direction of the rod section, and the lateral ribs of which the projecting height is different are formed on the larger ring section.

4. The torque rod according to claim 3, wherein the vertical rib is formed on the both sides of the center axis in the side view of the ring section.

5. The torque rod according to claim 4, wherein deep groove extends across the vertical rib.

6. The torque rod according to claim 5, wherein the depth of the groove between the adjacent lateral ribs is deepest in the center portion in the center axis direction.

* * * * *